US009592776B2

United States Patent
Fujita et al.

(10) Patent No.: US 9,592,776 B2
(45) Date of Patent: Mar. 14, 2017

(54) PROTECTOR AND WIRE WITH PROTECTOR (71) Applicant: Sumitomo Wiring Systems, Ltd., Yokkaichi, Mie (JP)

(72) Inventors: Tetsuya Fujita, Mie (JP); Masaru Watanabe, Mie (JP); Kaho Arai, Mie (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 15/058,197

(22) Filed: Mar. 2, 2016

(65) Prior Publication Data
US 2016/0280158 A1 Sep. 29, 2016

(30) Foreign Application Priority Data
Mar. 26, 2015 (JP) .................................. 2015-063811

(51) Int. Cl.
| H02G 3/00 | (2006.01) |
| H02G 3/04 | (2006.01) |
| B60R 16/02 | (2006.01) |
| H01B 7/00 | (2006.01) |
| H02G 3/14 | (2006.01) |
| H02G 3/18 | (2006.01) |
| H02G 3/32 | (2006.01) |

(52) U.S. Cl.
CPC ....... B60R 16/0215 (2013.01); H01B 7/0045 (2013.01); H02G 3/0406 (2013.01); H02G 3/0487 (2013.01); H02G 3/14 (2013.01); H02G 3/18 (2013.01); H02G 3/26 (2013.01); H02G 3/32 (2013.01)

(58) Field of Classification Search
CPC .... B60R 16/0215; H02G 3/0487; H02G 3/26; H02G 3/0406; H02G 3/14; H02G 3/18; H01B 7/0045
USPC .................................. 174/70 R, 72 A, 72 C
See application file for complete search history.

(56) References Cited

U.S. PATENT DOCUMENTS

| 4,864,082 A * | 9/1989 | Ono .................... H02G 3/0437 138/115 |
| 4,951,716 A * | 8/1990 | Tsunoda ............... H02G 3/0418 138/157 |

(Continued)

FOREIGN PATENT DOCUMENTS

| JP | H0666233 U | 9/1994 |
| JP | 2012-85478 | 4/2012 |
| JP | 2012-100460 | 5/2012 |

OTHER PUBLICATIONS

European Search Report Dated Aug. 5, 2016.

*Primary Examiner* — Sherman Ng
(74) *Attorney, Agent, or Firm* — Gerald E. Hespos; Michael J. Porco; Matthew T. Hespos (57) ABSTRACT

A protector 20 includes a wire accommodating portion 22 and a wire fixing piece 40. The wire accommodating portion 22 is formed with an accommodation space capable of accommodating wires 12 and a wire draw-out port 23 for drawing out the wires 12 accommodated in the accommodation space to outside. A wire fixing piece 40 is formed separately from the wire accommodating portion 22 and can be united with the wire draw-out port 23 in a state fixed at a certain position in an extending direction of the wires 12 by a binding member 18.

7 Claims, 9 Drawing Sheets

(56) References Cited

U.S. PATENT DOCUMENTS

| | | | |
|---|---|---|---|
| 5,332,866 A * | 7/1994 | Sawamura | H02G 3/0608 |
| | | | 138/166 |
| 6,229,091 B1 | 5/2001 | Ogawa | |
| 7,645,938 B2 * | 1/2010 | Kogure | B60R 16/0215 |
| | | | 174/68.1 |
| 2003/0183413 A1 | 10/2003 | Kato | |
| 2005/0145410 A1 * | 7/2005 | Daito | H02G 3/0418 |
| | | | 174/72 A |
| 2006/0090916 A1 * | 5/2006 | Suzuki | H02G 3/0691 |
| | | | 174/481 |
| 2009/0211781 A1 * | 8/2009 | Suzuki | B60R 16/0215 |
| | | | 174/101 |
| 2010/0147584 A1 * | 6/2010 | Suzuki | B60R 16/0215 |
| | | | 174/72 C |
| 2010/0236826 A1 * | 9/2010 | Suzuki | B60R 16/0215 |
| | | | 174/72 A |
| 2015/0041175 A1 | 2/2015 | Nakai | |
| 2016/0156165 A1 | 6/2016 | Katou | |

* cited by examiner

PROTECTOR AND WIRE WITH PROTECTOR

BACKGROUND

1. Field of the Invention

The invention relates to a protector for protecting a wire and to an assembly of a wire and protector.

2. Description of the Related Art

Japanese Unexamined Patent Publication No. 2012-85478 discloses a configuration for forming tape winding pieces on opposite ends of a protector. A wiring harness is fixed to the protector by winding an adhesive tape on the wiring harness and the tape winding pieces.

Japanese Unexamined Patent Publication No. 2012-100460 discloses a technology for inserting a base end part of a branch line into a slit of a rubber member and fitting this rubber member into a branch line accommodating portion of a protector to fix the rubber member.

However, according to the technology disclosed Japanese Unexamined Patent Publication No. 2012-85478, the adhesive tape winding operation needs to be performed with the wiring harness accommodated in a main body of the protector and the tape winding pieces are integrally formed to the main body of the protector. Thus, the tape winding operation is difficult depending on extending directions of the tape winding pieces.

Further, according to the technology disclosed in Japanese Unexamined Patent Publication No. 2012-100460, since a branch line holding force depends on a frictional force between the rubber member and the branch line, there is a problem of a weak holding force. Thus, if the branch line is pulled such as when the wiring harness is assembled in a vehicle, the branch line may be displaced relative to the rubber member.

Accordingly, the invention aims to enable a wire to be easily and reliably positioned and fixed in a protector.

SUMMARY

To solve the above problem, a protector according to a first aspect includes a wire accommodating portion formed with an accommodation space capable of accommodating a wire and a wire draw-out port for drawing out the wire accommodated in the accommodation space to outside, and a wire fixing piece formed separately from the wire accommodating portion and unitable with the wire draw-out port in a state fixed at a certain position in an extending direction of the wire by at least one binding member. Accordingly, the wire fixing piece can be fixed to the wire accommodating portion after the wire is fixed to the wire fixing piece by the binding member. Thus, the wire can be easily and reliably positioned and fixed in or to the protector.

The wire fixing piece may be unitable with the wire accommodating portion at a position where at least a part of the binding member for binding and fixing the wire and the wire fixing piece is arranged in the wire accommodating portion. Accordingly, the binding member can be protected since at least the part of the binding member is arranged in the wire accommodating portion.

The wire accommodating portion may include a protector main body with a bottom plate and a pair of side walls standing from opposite sides of the bottom plate, and a lid to be mounted on the protector main body to close an opening facing the bottom plate. Accordingly, the wire easily can be accommodated into the protector main body through the opening facing the bottom plate. By closing the opening with the lid, the wire and at least the part of the binding member can be protected.

The wire fixing piece may include a bound portion to be bound and fixed to the wire and a wide portion wider than the bound portion. At least one fixing projection may be formed on one of a side of the wide portion. The wire accommodating portion and a wire fixing recess may be formed on the other for receiving the fixing projection. Accordingly, the wire fixing piece can be fixed to the wire accommodating portion by arranging the fixing projection formed on the one of the side part of the wide portion and the wire accommodating portion in the wire fixing recess formed on the other with the bound portion. The wire then is bound and fixed. At this time, it is sufficient to arrange the fixing projection in the wire fixing recess formed on the side part of the wide portion, which is wider than the bound portion. Therefore a fixing operation by this arranging operation can be easily performed.

Plural wire fixing pieces may be provided, and the plural wire fixing pieces may be united or fixed substantially side by side with the wire draw-out port. Accordingly, an operation of binding and fixing the wire can be performed easily and the wire can be fixed more reliably since the wire can be bound and fixed to each of the plural wire fixing pieces.

An integrated wire fixing piece may be provided and may be integral to the wire draw-out port. The wire fixing piece is unitable with the wire draw-out port on a side adjacent to the integrated wire fixing piece. Accordingly, the operation of binding and fixing the wire can be performed easily and the wire can be fixed more reliably, since the wire can be bound and fixed to each of the integrated wire fixing piece and the wire fixing piece.

The invention also relates to an assembly with the above described protector, a wire and a binding member for binding and fixing the wire and the wire fixing piece. The wire fixing piece is accommodated in the accommodation space in a state where the wire fixing piece is united with the wire draw-out port and the wire is drawn out to outside from the wire draw-out port.

As described above, the wire fixing piece can be fixed to the wire accommodating portion after the wire is fixed to the wire fixing piece by the binding member. Thus, the wire can be easily and reliably positioned and fixed in the protector.

These and other features and advantages of the invention will become more apparent upon reading the following detailed description and accompanying drawings. Even though embodiments are described separately, single features thereof may be combined to additional embodiments.

DETAILED DESCRIPTION

Figure 1:
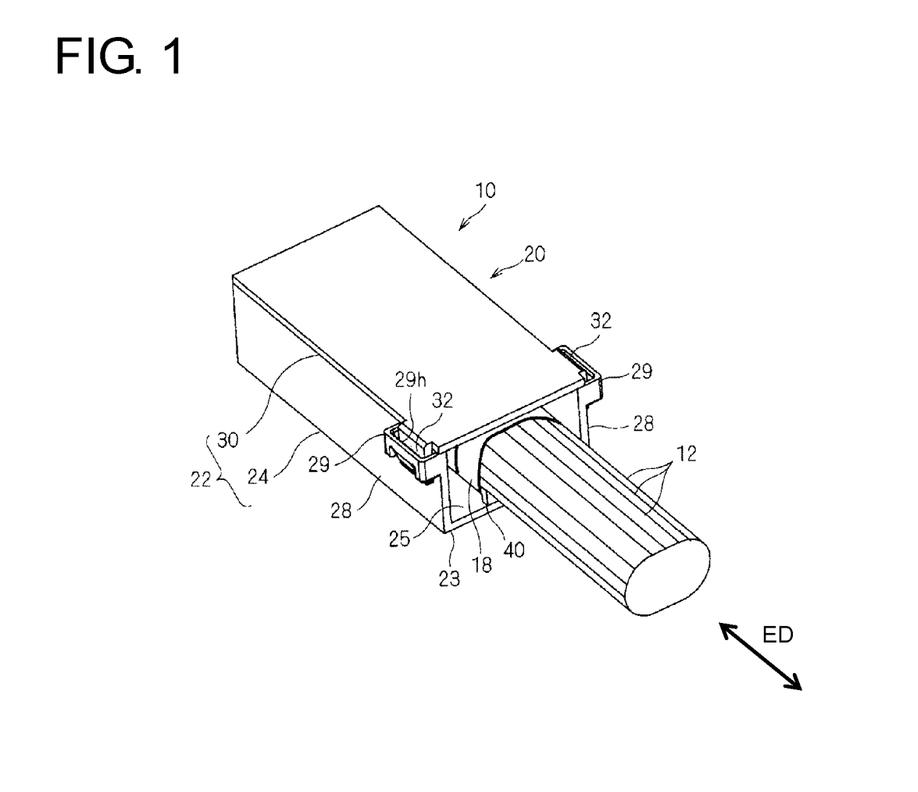
FIG. 1 is a perspective view showing wires with protector according to an embodiment.

A protector 20 and wires with protector 10 according to an embodiment are described. FIG. 1 is a perspective view showing the wires with protector 10. Note that one end part of the protector 20 is shown, but the other end part is not shown in FIG. 1 and each of other figures.

The wires with protector 10 include the protector 20, wires 12 and at least one binding member 18.

The wire 12 has an insulation coating formed around a conductive wire core. The wire 12 supplies power or transmits a signal. Here, the wires with protector 10 include a plurality of wires 12. The plural wires 12 may be branched in parts accommodated in the protector 20 or outside the protector 20. If the wires 12 are branched in the parts accommodated in the protector 20, the protector 20 may have an opening for allowing the parts branched at an intermediate part in an extending direction of the protector 20 to be extended to outside.

Connectors are mounted on end parts of the wires 12. The connectors are connected to various electrical components mounted in a vehicle with the wires and the protector 10 assembled in the vehicle. Specifically, the wires 12 are used as a wiring harness that is a wiring material in the vehicle. An optical fiber cable may be bundled together with the wires 12.

The protector 20 accommodates parts of the linear parts of the plurality of wires 12. The wires 12 are drawn out to outside through a wire draw-out port 23 on one end of the protector 20. The other end part of the protector 20 may be configured similarly to the wire draw-out port 23 described here or may be so configured that a wire fixing piece is formed integrally or unitarily.

Figure 2:
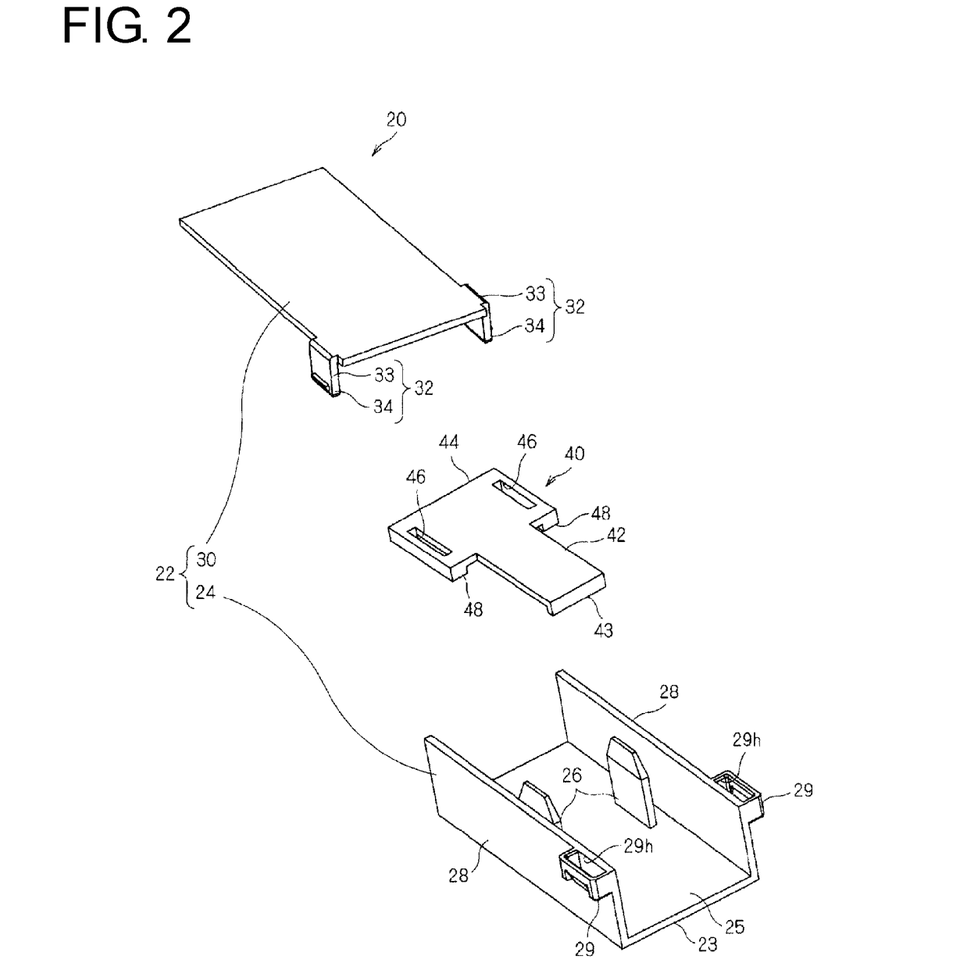
FIG. 2 is an exploded perspective view showing the protector.
Figure 3:
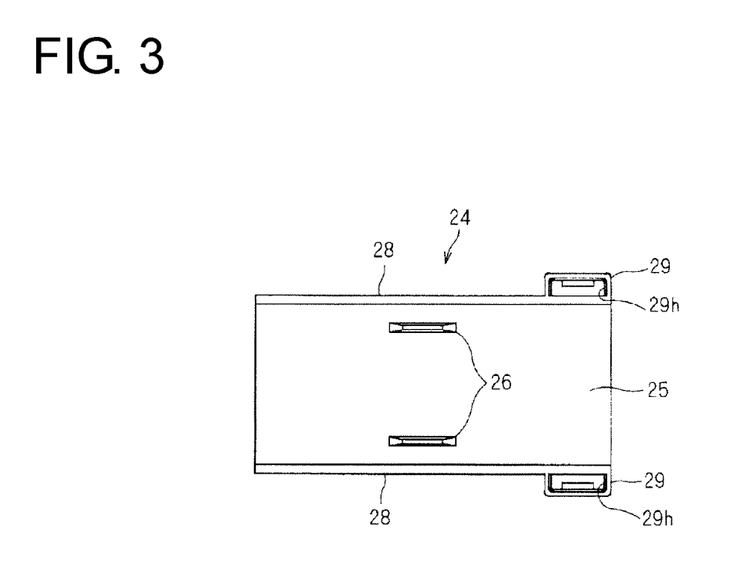
FIG. 3 is a plan view showing a protector main body portion.
Figure 4:
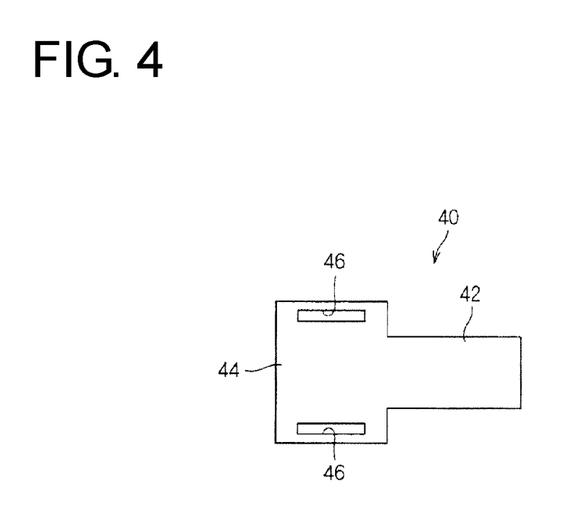
FIG. 4 is a plan view showing a wire fixing piece.
Figure 5:
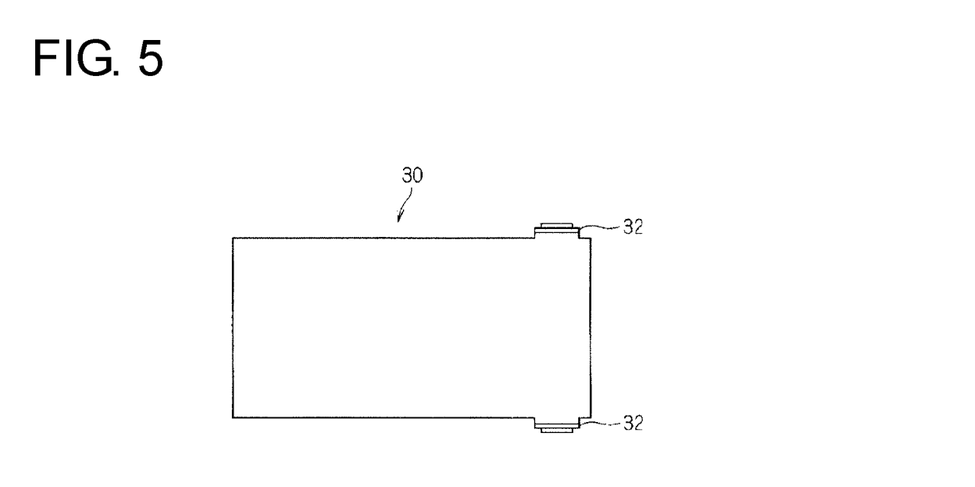
FIG. 5 is a plan view showing a lid portion.

FIG. 2 is an exploded perspective view showing the protector 20, FIG. 3 is a plan view showing a protector main body portion 24, FIG. 4 is a plan view showing a wire fixing piece 40 and FIG. 5 is a plan view showing a lid portion 30.

The protector 20 includes a wire accommodating portion 22 and the wire fixing piece 40. The wire accommodating portion 22 has a rectangular tubular shape, but other tubular shapes may be employed. A rectangular parallelepipedic accommodation space for accommodating the wires 12 is formed in the wire accommodating portion 22. Further, the wire draw-out ports 23 for drawing out the wires 12 are formed on opposite end parts of the wire accommodating portion 22. Here, the wire draw-out port 23 is a rectangular opening.

The wire accommodating portion 22 includes the protector main body 24 and the lid 30. The protector main body 24 is a member molded of resin or the like and includes a bottom plate 25 and a pair of side walls 28. The bottom plate 25 is a long and narrow plate and may be bent in a width or thickness direction thereof at an intermediate part in an extending direction thereof.

The side wall portions 28 stand at one principal surface of the bottom plate 25 from opposite side parts of the bottom plate 25. Note that although the side walls 28 are perpendicular to the bottom plate 25 here, the side walls 28 and the bottom plate 25 may be connected via curved parts.

Intermediate parts of the wires 12 in the extending direction ED can be accommodated in a space enclosed by the bottom plate 25 and the pair of side walls 28.

Fixing projections 26 are formed on an opening end part of the bottom plate 25 where the wire draw-out port 23 is formed. These fixing projections 26 are described in detail later in connection with the wire fixing piece 40.

Lock receiving portions 29 are provided on parts of outer surfaces of the side walls 28 on a side opposite to the bottom plate 25. The lock receiving portion 29 includes an opening 29h penetrating in a direction perpendicular to the bottom plate 25 and a lock 32 of the lid 30 to be described later is locked and fixed to the lock receiving portion 29 by being inserted into this opening 29h.

The lid 30 is molded of resin or the like and is configured to be mountable on the protector main body 24 to close an opening facing the bottom plate 25. The lid 30 is in the form of a long and narrow piece similar to the bottom plate 25 and is configured to close the entire opening of the protector main body 24 on the side opposite to the bottom plate 25.

Lock pieces 32 project at positions corresponding to the lock receiving portions 29 on opposite sides of the lid 30. The lock piece 32 includes a plate-like portion 33 projecting from the side of the lid 30 toward the protector main body 24 and a lock protrusion 34 projecting on an outer surface of a tip part of the plate-like portion 33. The lock protrusion 34 has a height that is reduced gradually toward a tip side of the lock piece 32. When the lock pieces 32 are inserted into the openings 29h of the lock receiving portions 29, the lock protrusions 34 retain and lock peripheral edges of the openings 29h while coming out of the openings 29h. In this way, the lock pieces 32 and the lock receiving portions 29 are locked and the lid 30 is mounted on the protector main body 24.

Thus, the wire draw-out port 23 on the end of the wire accommodating portion 22 is surrounded on plural (e.g. four) sides by the protector main body 24 and the lid 30.

Note that it is not essential to provide the lid 30. Accordingly, the wire accommodating portion may be left open on the side opposite to the bottom plate.

The wire fixing piece 40 is molded of resin or the like separately from the wire accommodating portion 22 and can be united with or connected to the wire draw-out port 23 in a state fixed at a certain position in the extending direction ED of the wires 12 by the binding member 18. More specifically, the wire fixing piece 40 is in the form of a plate and includes a bound portion 42 and a wide portion 44.

The bound portion 42 is a plate-like part to be bound and fixed to the wires 12. The bound portion 42 preferably has a width smaller than an outer diameter of a bundle of the plurality of wires 12. This enables a force of the binding member 18 for holding the plurality of wires 12 in a bundled state to effectively act and the wires 12 to be more reliably fixed in the bundled state at the certain position when the binding member 18 is wound on the bundle of the wires 12 and the bound portion 42.

Further, an edge of the bound portion 42 on a side opposite to the wide portion 44 is formed into a retaining portion 43 projecting toward one principal surface of the bound portion 42. The binding member 18 is wound on a part of the bound portion 42 inward of the retaining portion 43. In this way, the binding member 18 is caught by the retaining portion 43 to prevent a fall-off of the binding member 18 from the bound portion 42.

The wide portion 44 is a plate-like part integrally or unitarily formed to one end part of the bound portion 42 to spread on the same plane. The wide portion 44 is wider than the bound portion 42. Preferably, the wide portion 44 is wider than the outer diameter of the bundle of the wires 12. Thus opposite end parts of the wide portion 44 protrude laterally out from the bundle of the wires 12 with the bound portion 42 fixed to the bundle of the wires 12.

The fixing projections 26 are formed on one of the wide portion 44 and the wire draw-out port 23 of the wire accommodating portion 22 and the wire fixing recesses 46 are formed on the other. Here, the fixing projections 26 are formed on the protector main body 24 of the wire accommodating portion 22 and the wire fixing recesses 46 are formed on the wide portion 44. More specifically, two fixing projecting portions 26 are formed on opposite side parts of an end part of the bottom plate 25 of the protector main body portion 24 where the wire draw-out port 23 is formed.

The fixing projections 26 are flat plates extending along an extending direction of the side walls 28. This enables the wire fixing piece 40 to be held in a constant posture as much as possible in a state where the fixing projections 26 are inserted and fit in wire fixing recesses 46. Of course, the fixing projections 26 may be in the form of round bars, rectangular bars or any other suitable shape.

A height of the fixing projections 26 is equal to or slightly smaller than that of the side walls 28. Thus, tips of the fixing projections 26 are difficult to come out of the wire fixing recesses 46 in a state where the fixing projections 26 are inserted in the wire fixing recesses 46. Of course, the height of the fixing projecting portions 26 may be smaller than in the above example.

Further, the tips of the fixing projecting portions 26 are gradually narrower and thinner toward the tips. This enables the fixing projections 26 to be inserted easily into the wire fixing recesses 46. Of course, the tip parts of the fixing projections 26 may have the same dimensions as the remaining parts.

Opening parts of the wire fixing recesses 46 facing the bottom plate 25 may be gradually wider toward the bound portion 25. Further, the fixing projections 26 may be press-fit into the wire fixing recesses 46, thereby being retained. Furthermore, lock projections for retaining and locking the wire fixing recesses 46 in a state where the fixing projections 26 are inserted to the backs of the wire fixing recesses 46 may be provided to project on the fixing projecting portions 26.

The two fixing projections 26 are spaced apart from the side walls 28. An interval between the fixing projections 26 is equal to or larger than the outer diameter of the bundle of the wires 12 so that the bundle of the wires 12 to be arranged between the two fixing projections 26.

The wire fixing recesses 46 are formed at positions corresponding to the pair of fixing projections 26 on opposite side parts of the wide portion 44.

The wire fixing recesses 46 are rectangular through holes that are shaped and dimensioned so that the fixing projections 26 can fit therein as closely as possible.

Parts at outer sides of the wire fixing recesses 46 located on the side of the bottom plate 25 define protrusions 48 projecting about the same distance as the retaining portion 43. Thus, when the wire fixing piece 40 is arranged on the bottom plate 25, the retaining portion 43 and the pair of protrusions 48 are arranged in contact with the upper surface of the bottom plate 25.

When the fixing projections 26 are inserted and arranged in the pair of wire fixing recesses 46, the wire fixing piece 40 is fixed at the certain position relative to the wire draw-out port 23.

In this state, the positions of the fixing projections 26 are set so that at least a part of the binding member 18 wound on the bound portion 42 and the wires 12 is arranged in the wire accommodating portion 22. Here, the two fixing projections 26 are formed at positions where the wire fixing recesses 46 are arranged in a state where an end of the bound portion 42 is arranged in alignment with an edge of the wire draw-out port 23. Thus, when the fixing projections 26 are inserted and arranged into the wire fixing recesses 46 and the wire fixing piece 40 is united with the wire accommodating portion 22, the binding member 18 binding the bound portion 42 and the wires 12 is arranged in the wire draw-out port 23 of the wire accommodating portion 22.

The binding member 18 binds and fixes the wires 12 to the wire fixing piece 40. Here, the binding member 18 is an adhesive tape. The adhesive tape is such that an adhesive layer is formed on one principal surface of a band- or strip-like base material made e.g. of resin. By winding the adhesive tape around the wires 12 and the bound portion 42 in a state where the wire fixing piece 40 extends along the wires 12, the wires 12 and the wire fixing piece 40 are bound and fixed. Besides the adhesive tape, a binding band, cable clip or the like may be alternatively or additionally used as the binding member 18.

An operation of manufacturing the wires with protector 10 is described.

Figure 6:
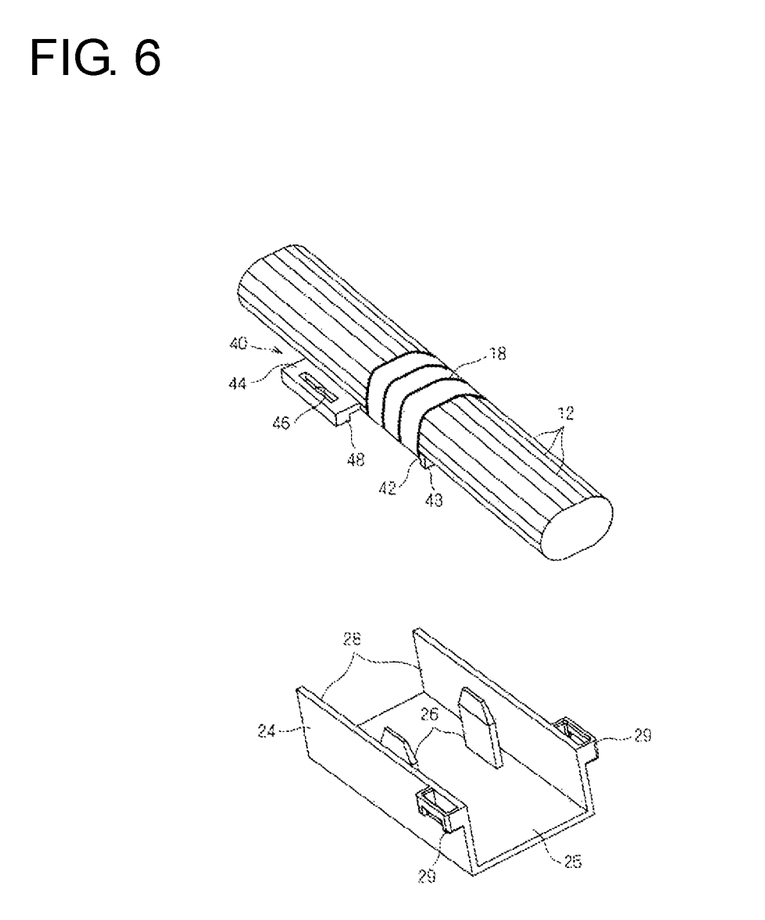
FIG. 6 is a diagram showing a manufacturing process of the wires with protector.

First, the bound portion 42 of the wire fixing piece 40 is arranged along the wires 12 at a position below the outer peripheries of the wires 12 at a certain position in the extending direction ED. Then, as shown in FIG. 6, the binding member 18 is fixed to the wires 12 and the bound portion 42, and the adhesive tape as the binding member 18 is wound around the wires 12 and the bound portion 42. This binding operation can be performed before the wires 12 are accommodated into the protector main body 24. Of course, it is also possible to perform the above binding operation in a state where parts of the wires 12 to be bound are taken out of the protector main body portion 24 with the wires 12 partly accommodated in the protector main body 24.

Figure 7:
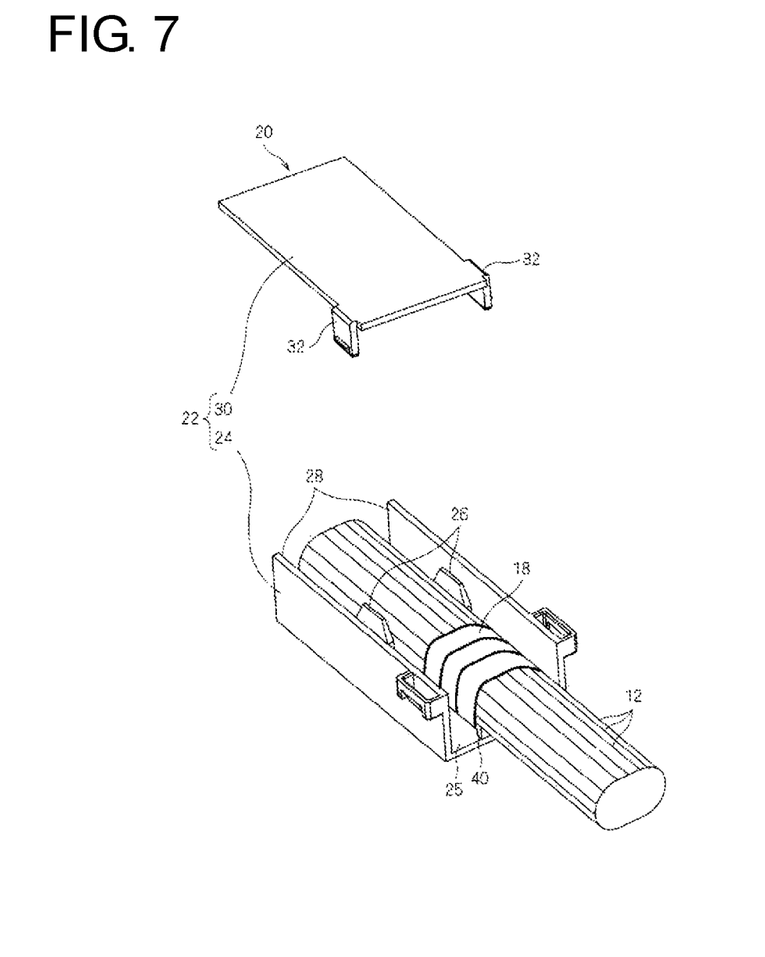
FIG. 7 is a diagram showing the manufacturing process of the wires with protector.

Thereafter, as shown in FIG. 7, the wires 12 are arranged in the accommodation space in the protector main body 24 and the two fixing projections 26 of the bottom plate 25 of the protector main body 24 are inserted into the wire fixing recesses 46 of the wire fixing piece 40 to unite the wire fixing piece 40 and the protector main body 24. In this way, predetermined parts of the wires 12 in the extending direction ED are supported at a certain position on one end side of) the protector main body portion 24.

The lock pieces 32 then are inserted into the lock receiving portions 29 to be locked and fixed, thereby mounting the lid 30 on the protector main body 24. In this way, the wires with protector 10 are manufactured.

According to the protector 20 and the wires with protector 10 configured as described above, the wire fixing piece 40 can be fixed to the protector main body 24 after the wires 12 are fixed to the wire fixing piece 40 by the binding member 18. Thus, the operation of binding the wire fixing piece 40 by the binding member 18 can be performed without being interfered by the wire accommodating portion 22. In addition, the wires 12 can be positioned reliably at the wire draw-out port 23 by fixing the wire fixing piece 40 to the protector main body 24. Further, since the wires 12 are bound and fixed to the wire fixing piece 40 by the adhesive tape, they can be fixed relatively inexpensively.

Further, since the binding member 18 is protected by being accommodated into the wire accommodating portion 22, the state where the wires 12 and the wire fixing piece 40 are bound by the binding member 18 is maintained more reliably. In this way, the state where the wires 12 are fixed more reliably at the certain position with respect to the wire accommodating portion 22 is maintained.

Note that it is not essential to accommodate the entire binding member 18 in the wire accommodating portion 22.

If at least a part of the binding member 18 is accommodated in the wire accommodating portion 22, that part can be protected by the wire accommodating portion 22.

Further, the wire accommodating portion 22 comprises the protector main body 24 and the lid 30. Thus, the wires 12 can be accommodated easily at least partly in the protector main body 24 and the wire fixing piece 40 can be fixed easily in the protector main body 24. Since the wire draw-out port 23 is closed on four sides by the protector main body 24 and the lid 30, at least parts of the wires 12 and the binding member 18 can be protected reliably. Particularly, the lid 30 can suppress exposure of the binding member 18 to water. Of course, it is not essential to arrange at least the part of the binding member 18 in the wire accommodating portion 22 and the entire binding member may be exposed from the wire accommodating portion (see later-described modification of in FIG. 9).

Further, since the fixing projections 26 are formed in the wire accommodating portion 22 and the wire fixing recesses that fit to the fixing projections 26 are formed on the side parts of the wide portion 44 of the wire fixing piece 40, the wire fixing piece 40 can be fixed to the wire accommodating portion 22 by arranging the fixing projections 26 into the wire fixing recesses 46 with the bound portion 42 and the wires 12 bound and fixed. At this time, since it is sufficient to arrange the fixing projections 26 into the wire fixing recesses 46 formed on the side parts of the wide portion 44 wider than the bound portion 42, the fixing operation by this arrangement can be performed easily.

Note that it is not essential to form the fixing projections 26 on the bottom plate 25 and the wire fixing recesses 46 on the wire fixing piece 40. Conversely, wire fixing recesses may be formed on the bottom plate and fixing projections projecting toward the bottom plate and to be arranged in the wire fixing recesses may be formed on the wire fixing piece.

Two fixing projections and two wire fixing recesses are formed here. However, other arrangements are possible. For example, one fixing projection may be formed on one side of the bottom plate and only one wire fixing recess may be formed on one side of the wire fixing piece. In this case, the other side part of the wire fixing piece (i.e. where no wire fixing recess is formed) may be pressed against the inner surface of the side wall.

The wire fixing recess is formed as a hole penetrating through the wide portion. However, a bottomed recess recessed from the bottom plate side may be formed on the wide portion and a fixing projection formed on the bottom plate and having a small height may be fitted into the bottomed recess. Further, the wire fixing recess may be open laterally of the wide portion.

Modifications based on the above embodiment are described.

Figure 8:
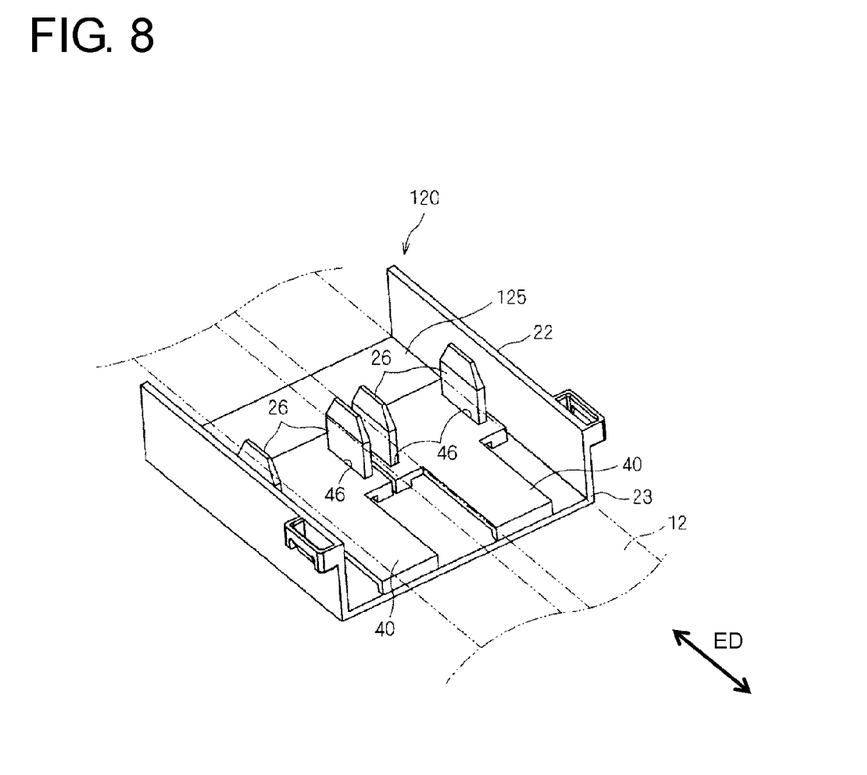
FIG. 8 is a diagram showing a protector according to a first modification.
Figure 9:
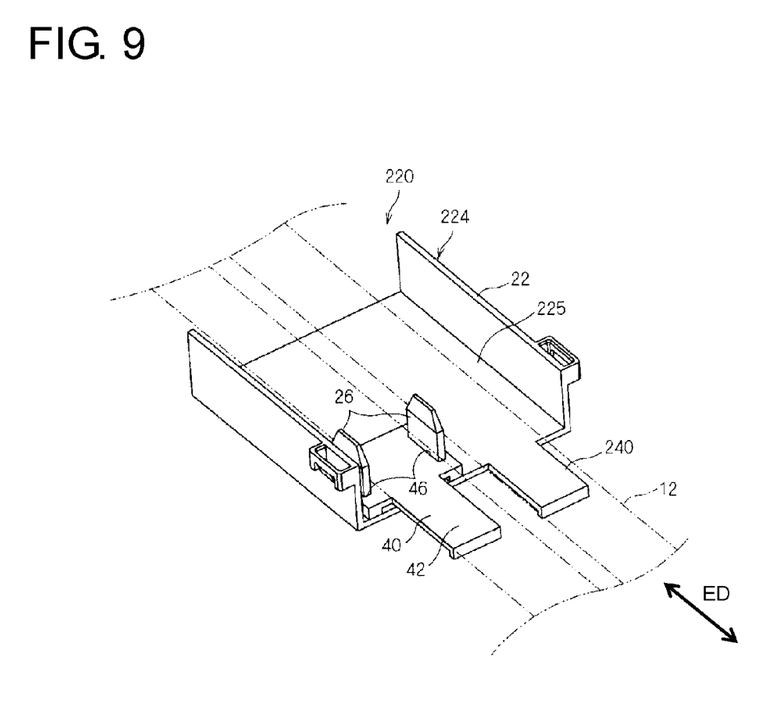
FIG. 9 is a diagram showing a protector according to a second modification.

FIG. 8 shows a modified embodiment of a protector 120 with two wire fixing pieces 40 that can be united with a wire draw-out port 23 of a wire accommodating portion 22 while being arranged side by side. Note that the outline of bundles of wires 12 is shown in FIGS. 8 and 9.

More specifically, a bottom plate 125 corresponding to the bottom plate 25 is formed to be wider. Pairs of fixing projections 26 are formed side by side in a width direction on the bottom plate 125. It should be understood that the fixing projections 26 may be offset along the extending direction ED of the wires 12.

Further, the wires 12 are bound and fixed to each of the wire fixing pieces 40 in the same manner as above. Each pair of fixing projections 26 are inserted into a pair of wire fixing recesses 46 of the corresponding wire fixing piece 40. In this way, the wire fixing pieces 40 are united and fixed side by side to the wire draw-out port 23. According to this example, functions and effects similar to those of the above embodiment can be obtained.

In addition, in the case of supporting a multitude of wires 12 on the flat wire accommodating portion 22, there is an advantage of being able to more reliably fix the multitude of wires 12 more reliably at a certain position.

Specifically, in the case of supporting a multitude of wires on a flat wire accommodating portion, it is considered to arrange a plurality of wires substantially side by side in a flat state on a wide wire fixing piece and bind and fix the wires. In this case, in a widthwise central part of the wide wire fixing piece, a binding force by a binding member is hard to act and the wires are easily displaced in that part.

Contrary to this, in this modification, the wires 12 can be divided into separate bundles and each bundle can be bound and fixed to the separate wire fixing piece 40. In this case, each wire fixing piece 40 can be relatively narrow, and the wires 12 can be supported more reliably at a certain position on each wire fixing piece 40. As a result, the multitude of wires 12 can be fixed more reliably at the certain position by the wire fixing pieces 40.

In addition, since the wire fixing pieces 40 can be handled separately in binding and fixing the respective wire fixing pieces 40 and the wires 12, one binding operation does not interfere with the other binding operation.

FIG. 9 illustrates a protector 220 according to a further modification. The protector 220 has an integrated wire fixing piece 240 integrally or unitarily formed to a wire draw-out port 23 and provided separately from the wire fixing piece 40. The wire fixing piece 40 can be united with the wire draw-out port 23 on a side adjacent to the integrated wire fixing piece 240.

More specifically, a bottom plate 225 corresponding to the bottom plate 25 is formed to be wider. The integrated wire fixing piece 240 extends out along the extension direction ED of the wires 12 from a position of an end part of the bottom plate 225 near one side. The integrated wire fixing piece 240 is molded unitarily to form a protector main body 224 including the bottom plate 225 and the like. The integrated wire fixing piece 240 is configured similarly to a bound portion 42.

Two fixing projections 26 project at positions of the upper or inner surface of the bottom plate 225 near the other side. The fixing projections 26 are inserted into wire fixing recesses 46 to unite the wire fixing piece 40 with the wide portion 23.

Note that the pair of fixing projections 26 are formed at positions of the bottom plate 225 near the end and the bound portion 42 projects from the bottom plate 225 similarly to the integrated wire fixing piece 240. Of course, the bound portion 42 may be arranged at a position to be accommodated in the wire draw-out port 23 as in the above embodiment. The arrangement of the integrated wire fixing piece 240 and the wire fixing piece 40 in an adjacent positional relationship also includes such a positional relationship.

Some of the wires 12 are bound and fixed to the integrated wire fixing piece 240. Further, the wire fixing piece 40 is united with the wide portion 23 by inserting the fixing projections 26 into the wire fixing recesses 46 after other of the wires 12 are bound and fixed to the bound portion 42.

According to this further modification, functions and effects similar to those of the above embodiment can be obtained for the configuration for binding and fixing the wires 12 and the wire fixing piece 40.

Further, since the multitude of wires 12 are divided, some of them are fixed to the integrated wire fixing piece 24 and the others are fixed to the wire fixing piece 40, the multitude of the wires 12 can be more reliably fixed at a certain position as in the above first modification. Further, since the wire fixing piece 40 and the integrated wire fixing piece 240 can be separately handled in binding and fixing the wire fixing piece 40 or the integrated wire fixing piece 240 and the wires 12, one binding operation does not interfere with the other binding operation.

Note that the respective configurations described in the above embodiment and each modification can be appropriately combined unless they contradict each other.

Although this invention has been described in detail above, the above description is illustrative in all aspects and this invention is not limited thereby. It should be understood that unillustrated numerous modifications can be made without departing from the scope of this invention as defined in the claims.

REFERENCE SIGNS

10 wires with protector
12 wire
18 binding member
20, 120, 220 protector
22 wire accommodating portion
23 wire draw-out port
24, 224 protector main body
25, 125, 225 bottom plate
26 fixing projection
28 side wall
30 lid
40 wire fixing piece
42 bound portion
44 wide portion
46 wire fixing recess
240 integrated wire fixing piece

What is claimed is:

1. A protector, comprising:
   a wire accommodating portion formed with an accommodation space capable of at least partly accommodating at least one wire and a wire draw-out port for drawing out the wire accommodated in the accommodation space to outside; and
   at least one wire fixing piece formed separately from the wire accommodating portion and unitable with the wire draw-out port in a state fixed at a certain position in an extending direction of the wire by at least one binding member, the wire fixing piece includes a bound portion to be bound and fixed to the wire and a wide portion wider than the bound portion; and
   at least one fixing projection is formed on one of a side part of the wide portion and the wire accommodating portion and a wire fixing recess, in which the fixing projecting portion is arrangeable, is formed on the other.

2. The protector of claim 1, wherein the wire fixing piece is unitable with the wire accommodating portion at a position where at least a part of the binding member for binding and fixing the wire and the wire fixing piece is arranged in the wire accommodating portion.

3. The protector of claim 2, wherein the wire accommodating portion includes:
   a protector main body with a base plate and one or more side walls standing from the base plate; and
   a lid to be mounted on the protector main body to at least partly close an opening of the protector main body.

4. The protector of claim 1, wherein:
   a plurality of the wire fixing pieces are provided; and
   the plurality of wire fixing pieces are unitable substantially side by side with the wire draw-out port.

5. The protector of claim 1, further comprising an integrated wire fixing piece integrally formed to the wire draw-out port.

6. The protector of claim 5, wherein the wire fixing pieceis unitable with the wire draw-out port on a side adjacent to the integrated wire fixing piece.

7. An assembly of a wire with protector, comprising:
   the protector of claim 1;
   a wire; and
   a binding member for binding and fixing the wire and the wire fixing piece;
   wherein the wire fixing piece is accommodated at least partly in the accommodation space in a state where the wire fixing piece is united with the wire draw-out port and the wire is drawn out to outside from the wire draw-out port.

* * * * *